United States Patent [19]

Tajima

[11] Patent Number: 4,901,147
[45] Date of Patent: Feb. 13, 1990

[54] VIDEO SYSTEM WITH SELF-DIAGNOSE FUNCTION

[75] Inventor: Teruo Tajima, Sakai, Japan

[73] Assignee: Kabushiki Kaisha Toshiba, Kawasaki, Japan

[21] Appl. No.: 174,505

[22] Filed: Mar. 28, 1988

[30] Foreign Application Priority Data

Mar. 30, 1987 [JP] Japan .................................. 62-47105

[51] Int. Cl.$^4$ ........................................... H04N 17/04
[52] U.S. Cl. ...................................... 358/139; 358/10; 358/903
[58] Field of Search ................. 358/139, 10, 903, 183; 371/20, 29; 340/720, 721, 732

[56] References Cited

U.S. PATENT DOCUMENTS

| 4,340,904 | 7/1982 | Wingrove, Jr. | 358/10 X |
| 4,682,246 | 7/1987 | Efron et al. | 358/139 X |
| 4,706,108 | 11/1987 | Kumagai et al. | 358/10 |
| 4,769,703 | 9/1988 | Osborne et al. | 358/10 X |

FOREIGN PATENT DOCUMENTS

| 0198692 | 4/1986 | European Pat. Off. |
| 3406890 | 9/1985 | Fed. Rep. of Germany . |
| 3409855 | 9/1985 | Fed. Rep. of Germany . |

Primary Examiner—James J. Groody
Assistant Examiner—Victor R. Kostak
Attorney, Agent, or Firm—Cushman, Darby & Cushman

[57] ABSTRACT

A video signal processing section receives a video signal and performs predetermined processing for the video signal. A control information supplying section is coupled to the video signal processing section and supplies output control information for the predetermined processing. An information input section is coupled to the control information supplying section and receives input control information for changing the output control information. A determination section is coupled to the information input section and the control information supplying section, and determines a relationship between the output control information and the input control information. A display signal generating section is coupled to the determination section and generates a predetermined display signal corresponding to a determination result from the determination section. A synthesizing section is coupled to the video signal processing section and the display signal generating section, and synthesizes the predetermined display signal on the video signal. A display section receives and displays an output signal from the synthesizing section.

20 Claims, 13 Drawing Sheets

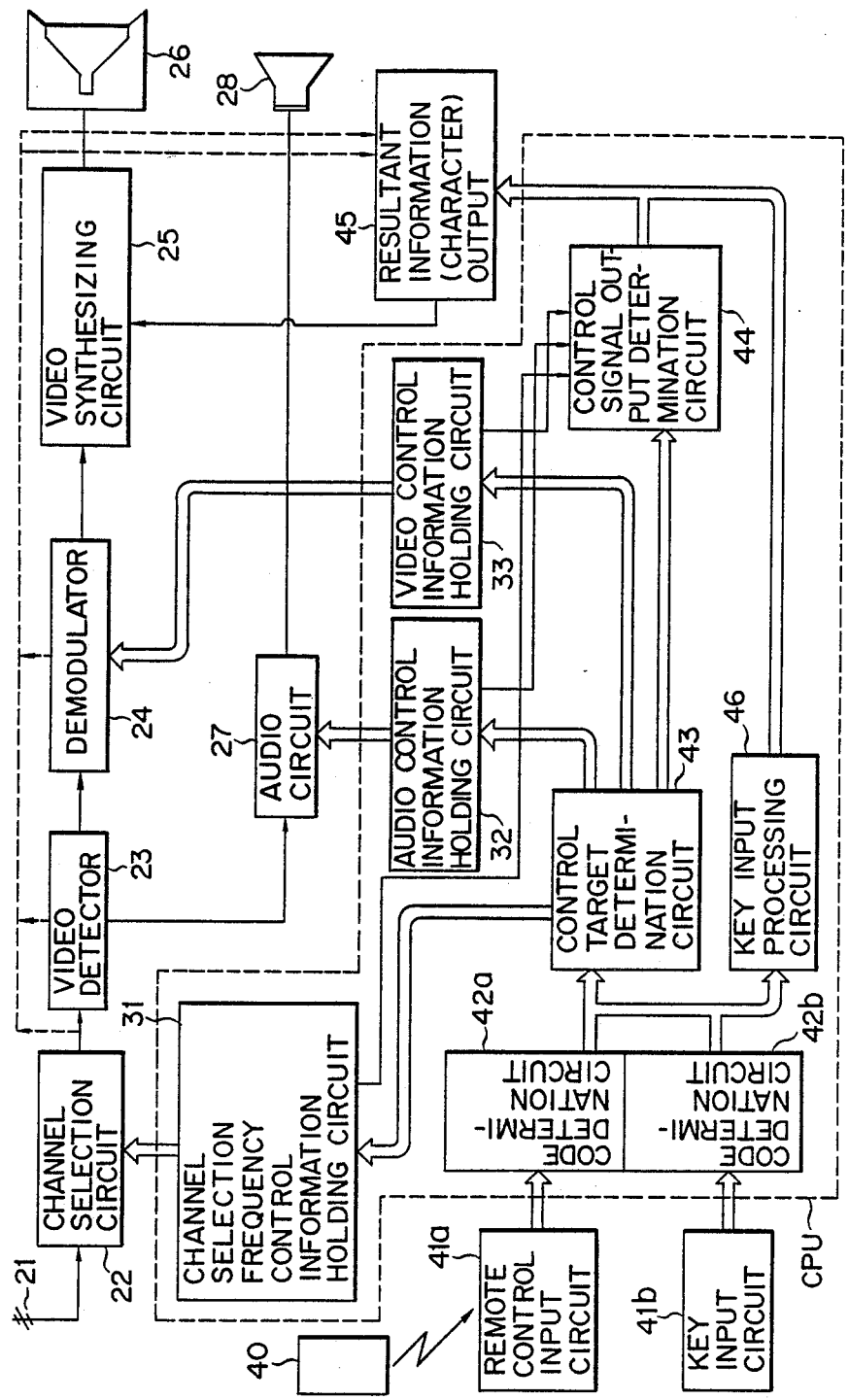
F I G. 1

FIG. 2A  | NEW > OLD |

FIG. 2B  | NEW < OLD |

FIG. 2C  | NEW = OLD |

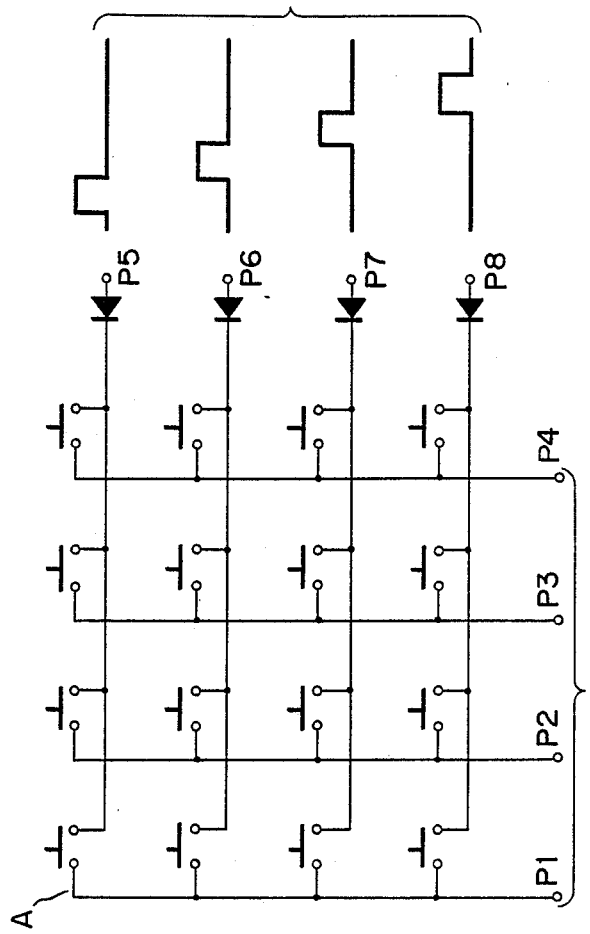
F I G. 3
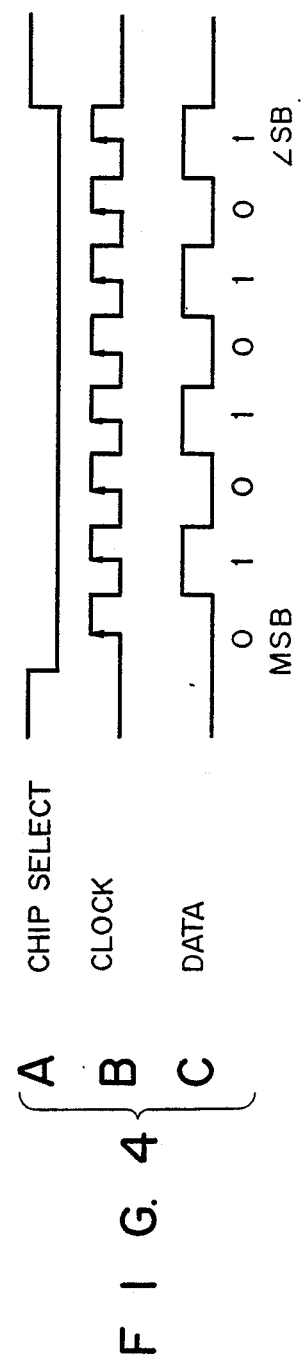
F I G. 4

|    | P1   | P2   | P3   | P4   |
|----|------|------|------|------|
| P5 | HIGH | LOW  | LOW  | LOW  |
| P6 | LOW  | HIGH | LOW  | LOW  |
| P7 | LOW  | LOW  | LOW  | LOW  |
| P8 | LOW  | LOW  | LOW  | HIGH |
FIG. 5A
$$\begin{cases}(1\ 0\ 0\ 0)\\(0\ 1\ 0\ 0)\\(0\ 0\ 0\ 0)\\(0\ 0\ 0\ 1)\end{cases}$$
FIG. 5B
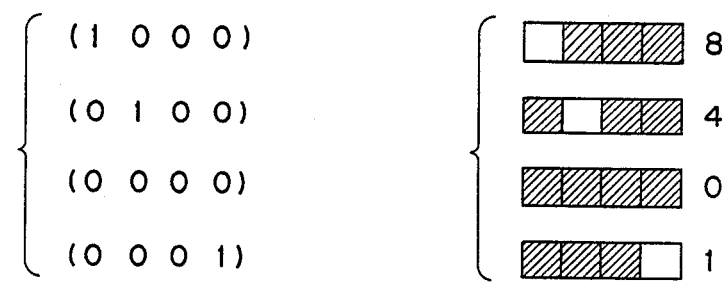
FIG. 5C
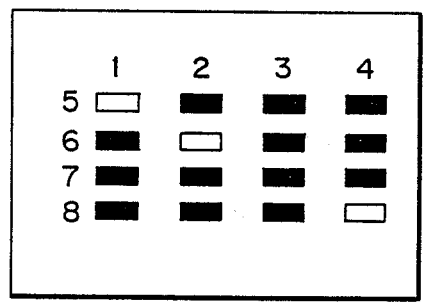
FIG. 5D

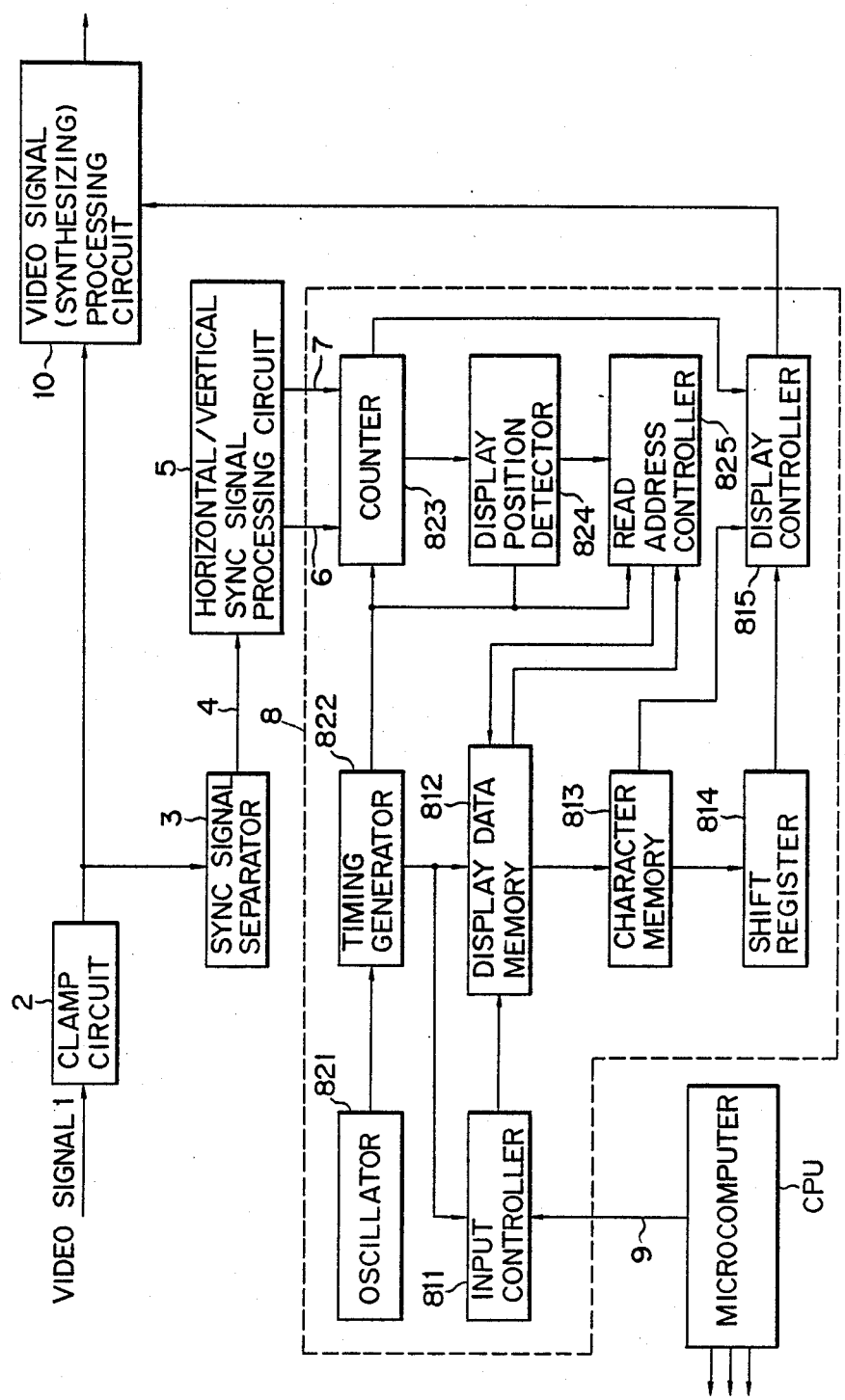
F I G. 7

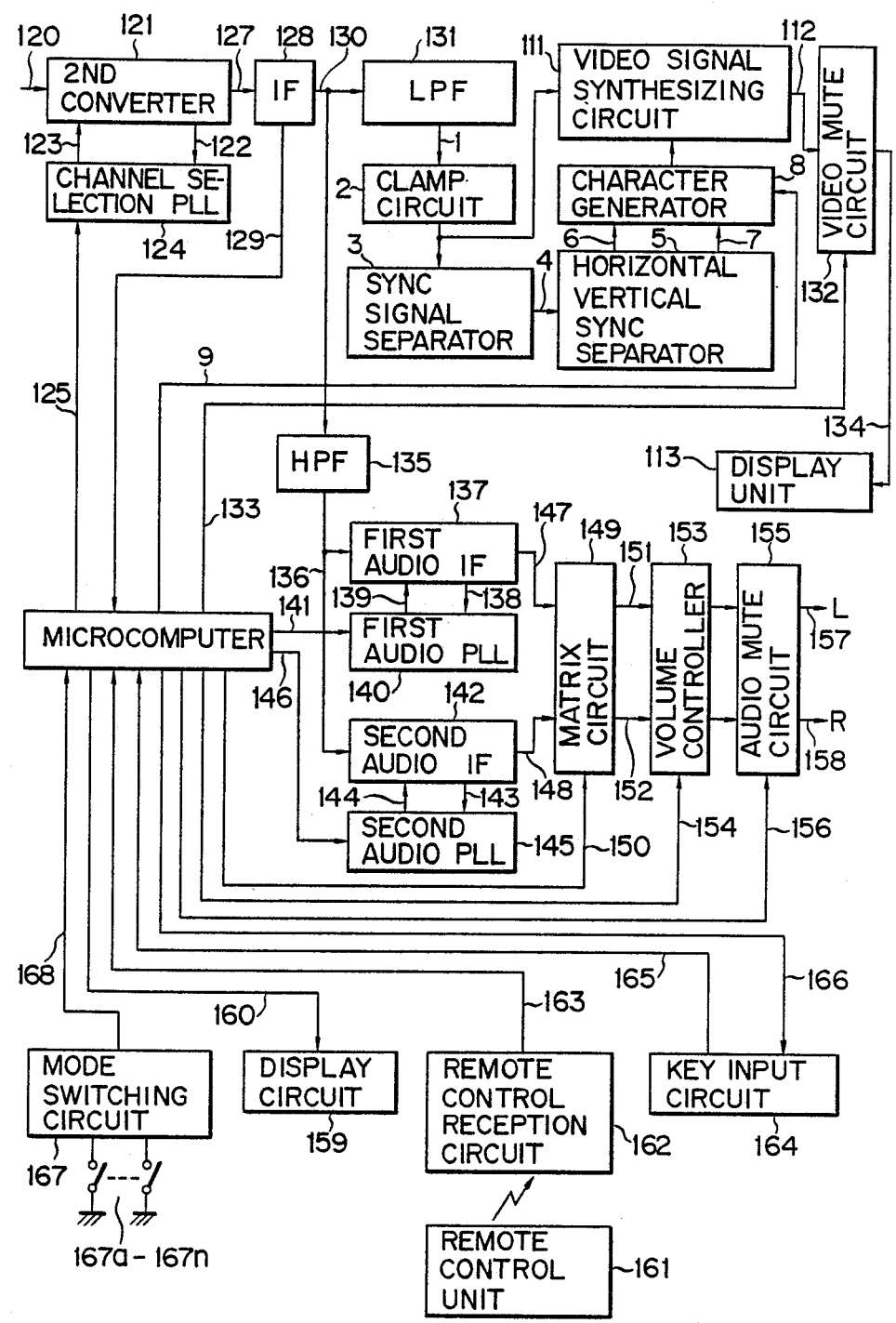
F I G. 9

F I G. 12A
- OUTPUT CONTROL SIGNAL (i) 1101001100011101 0
- OUTPUT CONTROL SIGNAL (ii) 0111000110110000
- OUTPUT CONTROL SIGNAL (iii) 0101101001101100
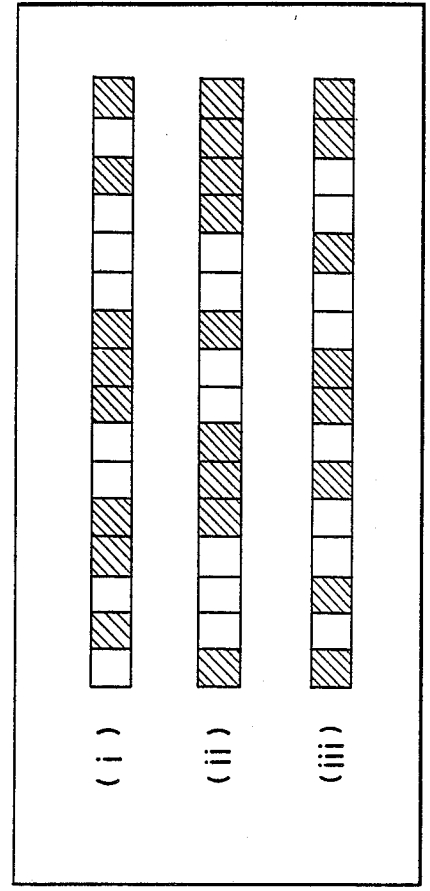
F I G. 12B

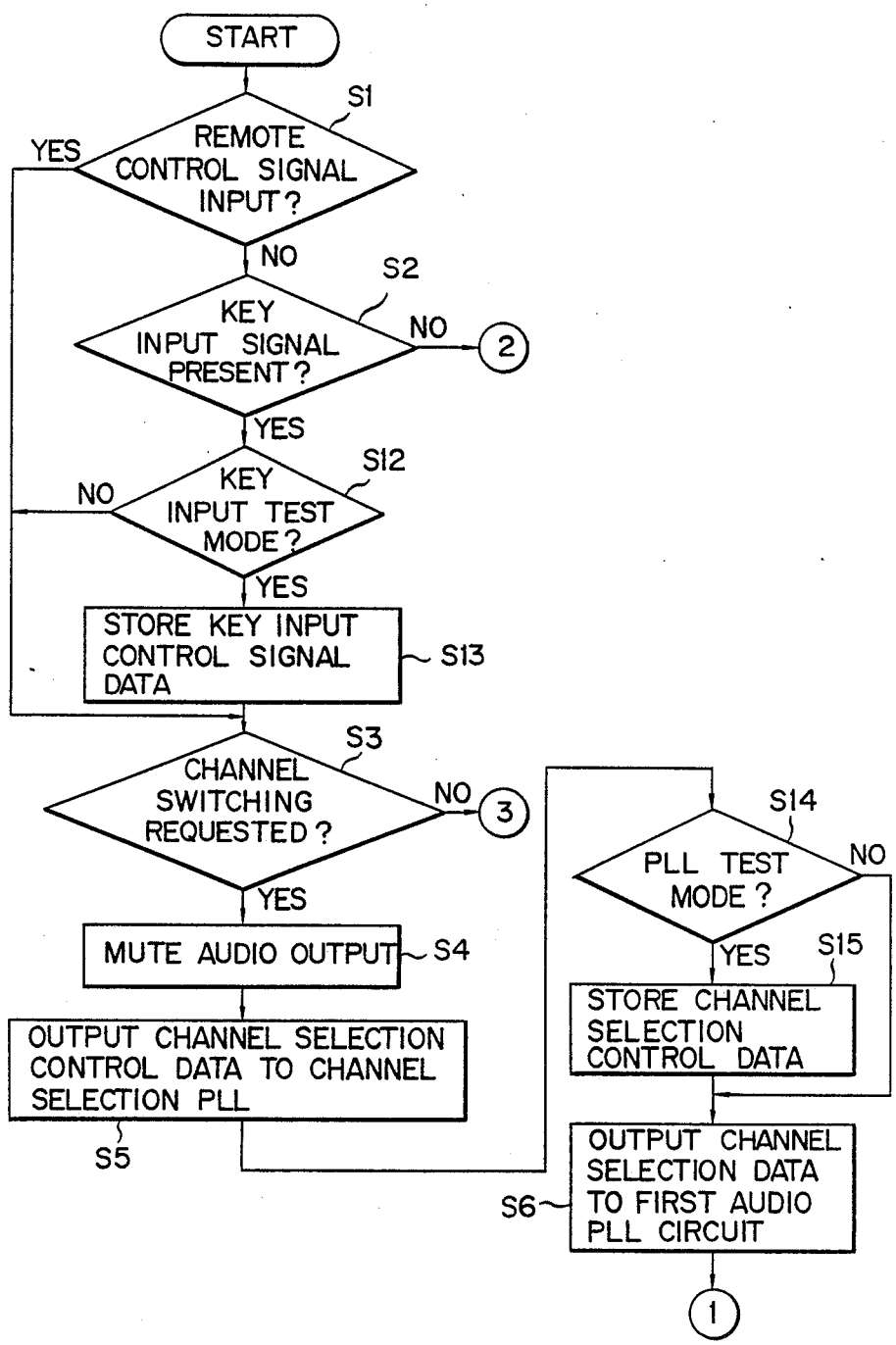
F I G. 13A

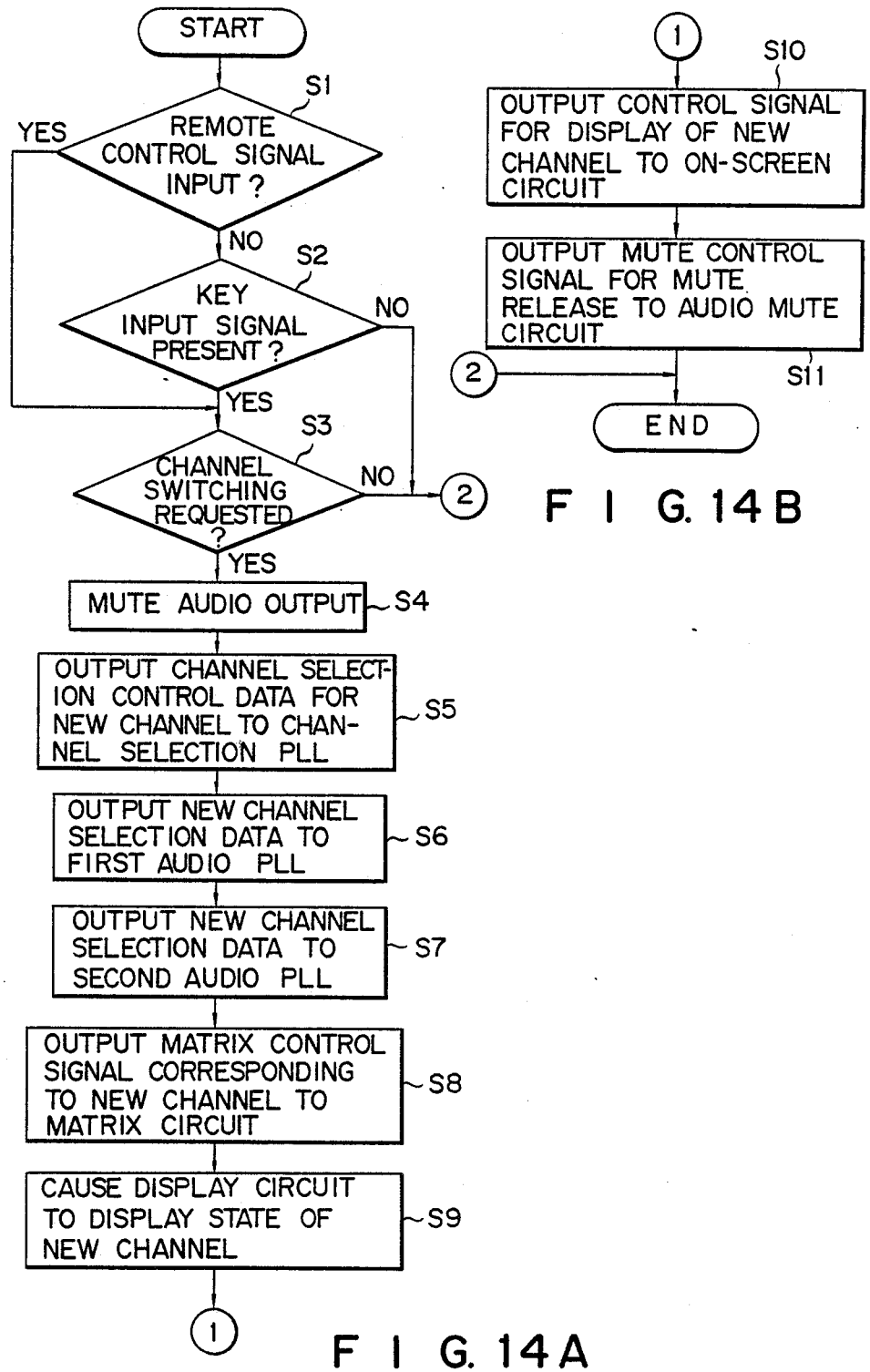
F I G. 14 B
F I G. 14 A

VIDEO SYSTEM WITH SELF-DIAGNOSE FUNCTION

BACKGROUND OF THE INVENTION

1. Field of the Invention

This invention relates to a video system with a self-diagnose function and, more particularly, to a test device arranged in a video signal processing apparatus and especially used in a television receiver or the like, using a video signal mixer for superposing character or graphic data on a video signal and displaying them on a screen of a display unit such as a CRT.

2. Description of the Related Art

In a recent video apparatus, a so-called on-screen function is added, which serves to accurately display an operation state of the apparatus on a screen using graphic or character patterns, thereby facilitating operation for a user. Typical examples of this type are reception channel display and a volume display during volume control in a color television receiver. Such a function can be realized by utilizing a character generator for generating graphic and character patterns to be displayed, and a video signal mixer for superposing character and graphic data on a video signal.

In general, the character generator is controlled in accordance with external control data using a microcomputer because the control requires various operations by means of external control data. A system including a microcomputer controls not only the character generator but also various functions. For example, in a satellite broadcast receiver, the microcomputer controls various functions related to a channel selection operation, an AFT operation, a video mute operation, an operation for switching the audio modes (including display), i.e., stereo and monaural modes, an audio mute operation, a key scanning operation for an input operation system, and the like in accordance with external control signals.

As the video system is allowed to increase its functions and receive a large quantity of external control signals and data by using the microcomputer in the above manner, the number of input and output ports (terminals) for the microcomputer is increased.

If the number of input/output terminals is increased, in order to increase utilization efficiency in each terminal, each terminal is time-divisionally used and the wiring for control signals becomes complicated. When any one of the wirings is disconnected or damaged due to a short circuit or the like, in a conventional test, each terminal is subjected to measurement by means of a simple measurement device generally called a tester such as a root-mean-square voltmeter or a root-mean-square ammeter. However, since the logical state of each terminal is changed with a lapse of time, it is very difficult to detect a defective portion.

If it is desirable to find a defective portion quickly, an expensive measuring device such as a logic analyzer is required.

SUMMARY OF THE INVENTION

It is, therefore, an object of the present invention to provide a new and improved video system with a self-diagnosis which performs a self-diagnosis for allowing control data in a video apparatus to be displayed on a display unit so that various tests can be easily performed within a short period of time by utilizing a control system in the video apparatus and its display unit.

According to the present invention, there is provided a video system with a self-diagnose function, comprising:

video signal processing means for receiving a video signal and performing predetermined processing for the video signal;

control information supplying means, coupled to the video signal processing means, for supplying output control information for the predetermined processing;

information input means, coupled to the control information supplying means, for receiving input control information for changing the output control information;

determination means, coupled to the information input means and the control information supplying means, for determining a relationship between the output control information and the input control information;

display signal generating means, coupled to the determination means, for generating a predetermined display signal corresponding to a determination result from the determination means;

synthesizing means, coupled to the video signal processing means and the display signal generating means, for synthesizing the predetermined display signal on the video signal; and display means for receiving an output signal from the superposing means and synthesizing a resultant image.

BRIEF DESCRIPTION OF THE DRAWINGS

These and other objects and features of the present invention can be understood through the following embodiments by reference to the accompanying drawings, in which:

FIG. 1 is a block diagram of a circuit according to an embodiment of the present invention;

FIGS. 2A to 2C, FIG. 3, and FIGS. 4A to 4C are views showing display contents and illustrating a key circuit and data formats, respectively, for explaining an operation of the circuit in FIG. 1;

FIGS. 5A to 5D are views illustrating data formats and display contents for explaining the operation of the circuit in FIG. 1;

FIG. 7 is a detailed block diagram of a character generator in FIG. 1;

FIG. 9 is a block diagram of a circuit according to a third embodiment, of the present invention;

FIGS. 10A to 10C, FIGS. 11A to 11E, and FIGS. 12A and 12B show data formats and display contents, respectively, for explaining an operation of the circuit in FIG. 9; and FIGS. 13A and 13B, and FIGS. 14A and 14B are flow charts showing operation sequences of the circuit in FIG. 8.

DETAILED DESCRIPTION OF THE PREFERRED EMBODIMENTS

Figures 6A, 6B:
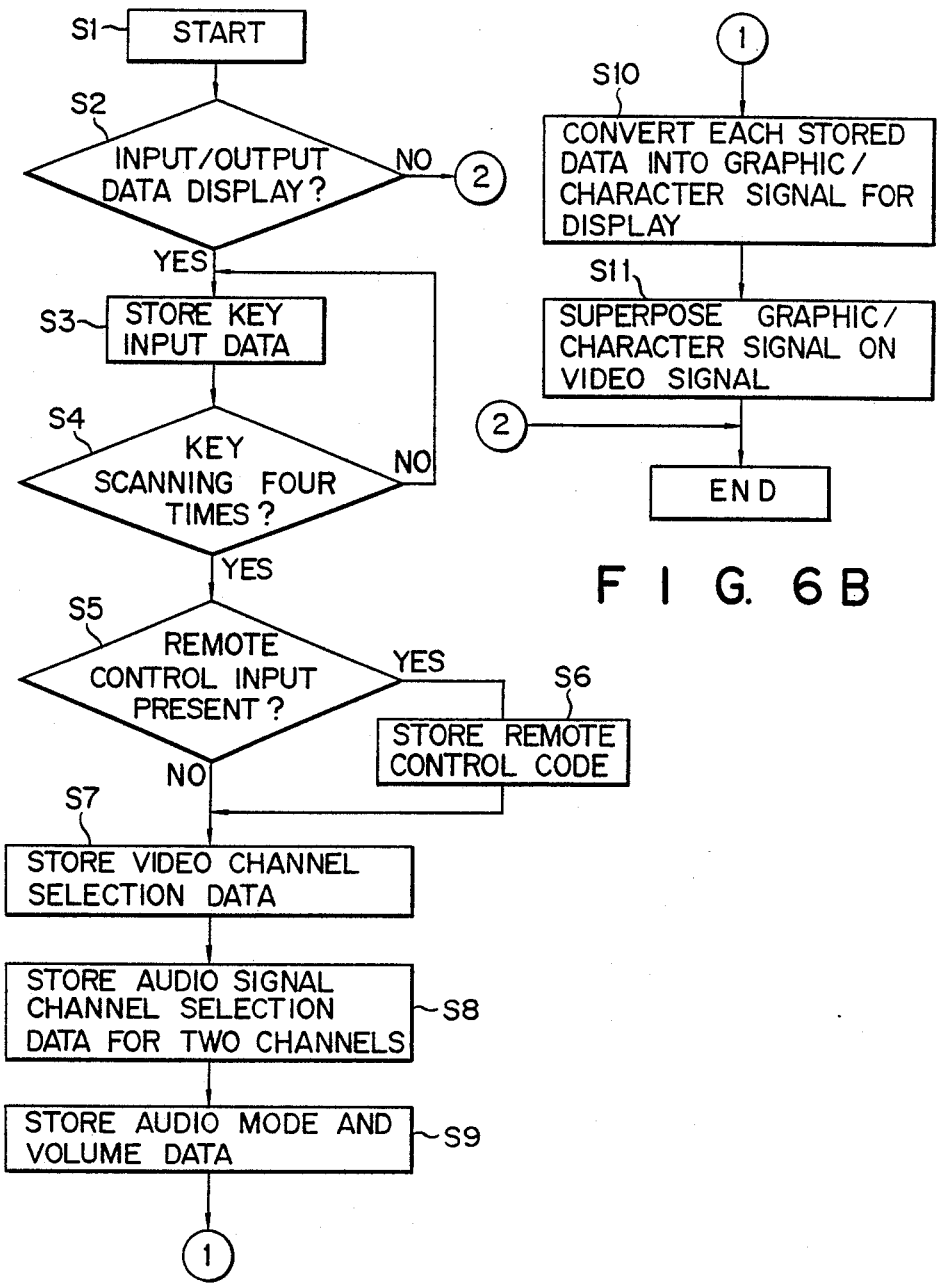
FIGS. 6A and 6B are flow charts showing an operation sequence of the circuit in FIG. 1.

Embodiments of the present invention will be described below with reference to the accompanying drawings.

FIG. 1 shows a television receiver to which a first embodiment of the present invention is applied. Referring to FIG. 1, a portion surrounded by a broken line is a microcomputer (CPU), which is divided into functional blocks. A high-frequency signal from antenna 21 is introduced to channel selection circuit 22. Channel selection circuit 22 receives channel selection data from holding circuit 31, which is arranged in the CPU and stores channel selection frequency control information, and selects a channel corresponding to the channel selection data. An intermediate-frequency signal from channel selection circuit 22 is supplied to video detector 23 and detected. The detected video signal is demodulated by demodulator 24, and is subjected to control operations such as a luminance adjustment and a chrominance adjustment. Then, the resultant signal is supplied to CRT display unit 26 through video mixer 25.

In audio circuit 27, various adjustment and control operations are performed with respect to audio signals. Outputs from audio circuit 27 are supplied to speaker 28.

As described above, data held in channel selection frequency information holding circuit 31 includes channel selection data. Volume control data, tone control data, stereo sound processing control data, monaural sound processing control data, multichannel television sound processing control data, and the like are held in holding circuit 32, which is arranged in the CPU and stores audio control information to be used in audio circuit 27. In addition, information for controlling demodulator 24 is held in holding circuit 33 in the CPU. The information includes brightness and contrast control information for adjustments of image quality, and hue and saturation control data for adjustments of color.

When the values of the above-described control data are changed or the processing modes are switched, an operation signal is supplied from remote control circuit 41a or key input circuit 41b. Remote control circuit 41a obtains a reception signal by receiving a transmission signal from remote controller 40.

Figures 2A, 2B, 2C:
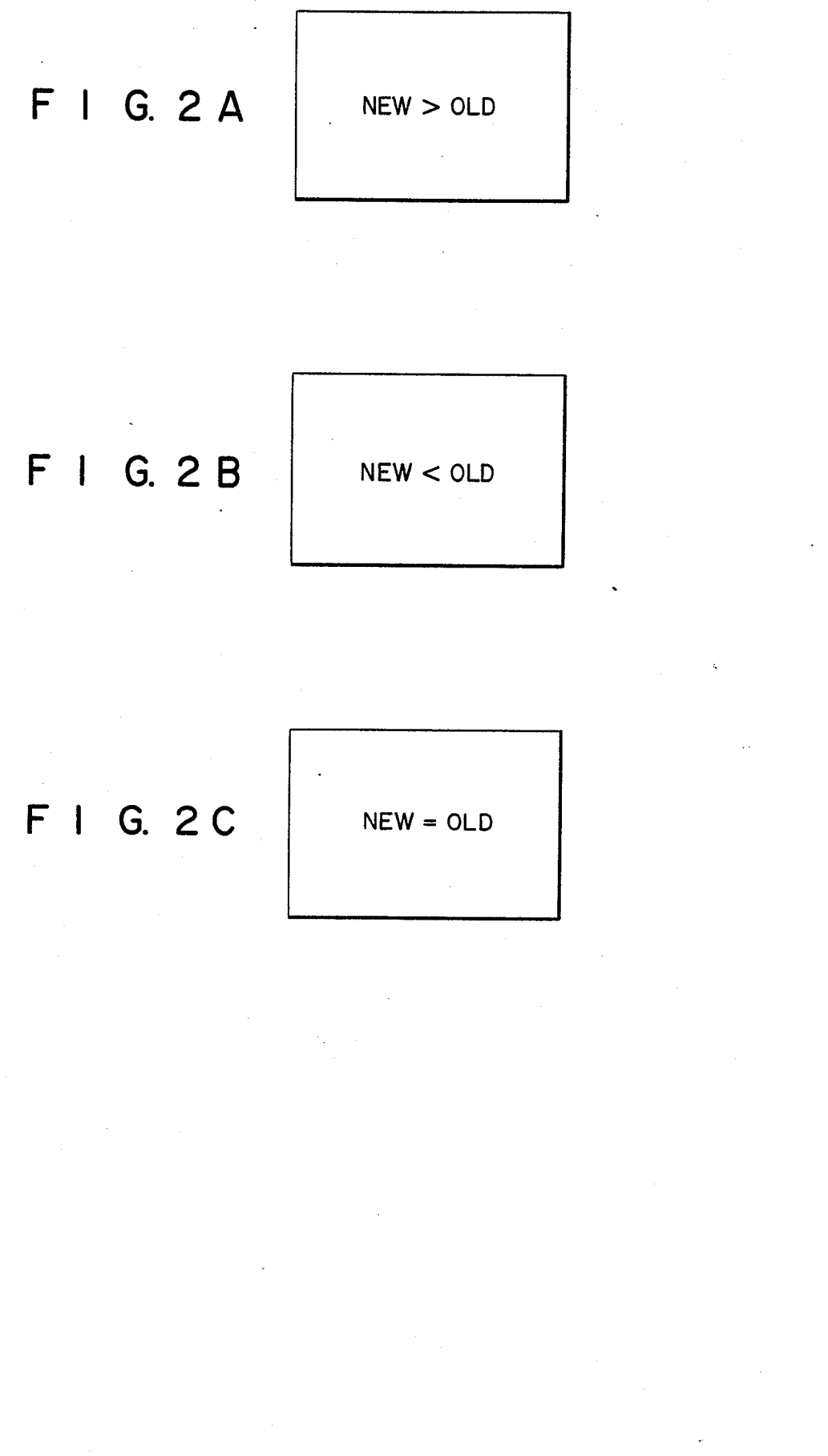

Outputs from remote control circuit 41a and key input circuit 41b are respectively supplied to code determination circuits 42a and 42b in the CPU, and are extracted as control codes. The extracted control code is supplied to control target determination circuit 43 in the CPU, and a corresponding control target is discriminated. Upon discrimination, the control data is transferred to a holding circuit corresponding to the target circuit to be controlled. Each of holding circuits 31, 32, and 33 holds the control data supplied from determination circuit 43, and transmits, e.g., previously held control data to control signal output determination circuit 44 in the CPU. Control signal output determination circuit 44 compares the new control data supplied from control target determination circuit 43 with the previous control data supplied from a corresponding holding circuit, and determines whether the new control data is larger or smaller. Control signal output determination circuit 44 outputs a determination result discriminating whether the new control data is large or small, and supplies it to resultant information output circuit 45. When the new control data is large, resultant information output circuit 45 outputs a display signal as a determination output for displaying, e.g., "NEW>OLD", as shown in FIG. 2A. Otherwise, circuit 45 outputs a display signal for displaying "NEW<OLD", as shown in FIG. 2B, and supplies it to mixer 25. When the new control data and the previous one are identical, circuit 45 supplies a display signal for displaying "NEW=OLD", as shown in FIG. 2C. Thus, a user can confirm whether an operation of the user coincides with the state of a display while watching the screen.

For example, in the tone adjustment, it can be confirmed whether the direction in which the volume of a sound is increased coincides with the direction requested by an operation. Therefore, it can be confirmed in the above-described manner whether each function is properly controlled.

When control is not performed as the user requests, it can be confirmed whether a key input is actually supplied or not through the screen as follows. When a key input is to be confirmed, key input processing circuit 46 is selected to be operated. Key input processing circuit 46 is set in the operation state by, e.g., a mode selection switch (not shown) or an input of a predetermined code which is not used in a normal operation. An operation of key input processing circuit 46 will be described, wherein channel selection is performed.

For the sake of a simple description, the number of keys of key input processing circuit 46 is set to be 16, as shown in FIG. 3, and channel selection data is set to be 8-bit serial data, as shown in FIG. 4C. Note that FIGS. 4A and 4B respectively show a chip selection signal and a clock signal. When the user operates the keys, outputs are obtained from pins P1 to P4. The resultant data are temporarily stored in a data holding section in key input processing circuit 46. In this case, for example, the storage format corresponds to the key arrangement, as shown in FIG. 5A. If each data in this storage section is extracted in the column direction, it can be represented as binary data, as shown in FIG. 5B.

At this time, key input processing circuit 46 generates graphic data (FIG. 5C) discriminating between high-level and low-level portions in the data and supplies it to mixer 25 through resultant information output circuit 45. With this operation, a block corresponding to the key arrangement is displayed on the screen, as shown in FIG. 5D. In this case, portions corresponding to keys which are operated are displayed as white portions, whereas portions corresponding to keys which are not operated are displayed as black portions.

Thus, the user can confirm whether his operation corresponds to a display state or not. Therefore, when a control function of the system cannot be operated as the user requests and it is confirmed through key input processing circuit 46 that a desired key input is not provided, a defect is present between a keyboard and an I/O port of the system. When a key input is normally entered but a control function of the system cannot be effected as the user requests, the control function in the system or a circuit to be controlled is failed.

FIGS. 6A and 6B are flow charts when channel selection and key input processing are performed. In steps S1 to S4, processing for storing a key input is performed. In steps S5 to S7, if an input from the remote controller is present, the input is stored. In steps S8 and S9, processing for audio control information is performed, and the control data is stored. In steps S10 and S11, a display signal for showing a state of each storage data is superposed on a video signal and displayed, thereby completing the operation.

Note that resultant information output circuit 45 includes a character generator. The character generator is designed to receive horizontal and vertical sync signals, which are used to define display positions of graphic or character patterns to be displayed, through video detector 23 or a clamp circuit included in demodulator 24, a sync signal separator, and horizontal/vertical sync signal processing circuit.

FIG. 7 shows such a character generator (resultant information output circuit) in detail.

Video signal 1 is clamped by clamp circuit 2 such that DC levels of leading edge portions of a sync signal are made constant, and then supplied to video signal processing circuit 10 and sync signal separator 3.

Composite sync signal 4 separated by sync signal separator 3 is supplied to horizontal/vertical sync signal processing circuit 5. Horizontal/vertical sync signal processing circuit 5 includes an oscillator. Horizontal/vertical sync signal processing circuit 5 obtains an oscillation signal, which has been subjected to automatic frequency control (AFC) so as to be synchronized with the input composite sync signal, and then generates horizontal and vertical sync signals 6 and 7 using the oscillation signal. Horizontal and vertical sync signals 6 and 7 are supplied to counter 823 in character generator 8.

Character generator 8 is controlled by control data from the microcomputer (CPU) in the same manner as in FIG. 1, and generates a display signal for a graphic pattern, a character pattern, or the like to be displayed on the screen. After the display position and the size are set, the display signal is supplied to video signal processing (synthesizing) circuit 10.

In video signal processing circuit 10, the display signal is superposed on the video signal, and the resultant output video signal is supplied to a display unit such as a color CRT.

Character generator 8 will be described. Character generator includes oscillator 821 for obtaining a fundamental clock so as to obtain an internal data processing timing, and supplies its output clock to timing generator 822. Timing generator 822 generates various timing pulses, and controls read and output timings of input control circuit 811 so as to read control data input from microcomputer 7. When the control data read by input control circuit 811 is the one used for a display, the control data is stored in display data memory 812. Output data from display data memory 812 designates a read address of character memory 813. Data read out from character memory 813 is supplied to shift register 814, series-converted, and supplied to video signal processing circuit 10 through display controller 815. The read timing of display data read out from character memory 813 is determined on the basis of the detection timing of display position detector 824 for detecting a display position on the basis of an output from counter 823. Display position detector 824 sets a display position on the basis of timing signals from timing generator 822 and counter 823. A timing signal by which a display position is set is supplied to read address control circuit 825. In accordance with this timing signal, read address control circuit 825 determines the start and end read addresses of display data memory 812.

In the video apparatus having the microcomputer (CPU) as described above, various function control operations are performed other than the control of character generator 8.

Figure 8:
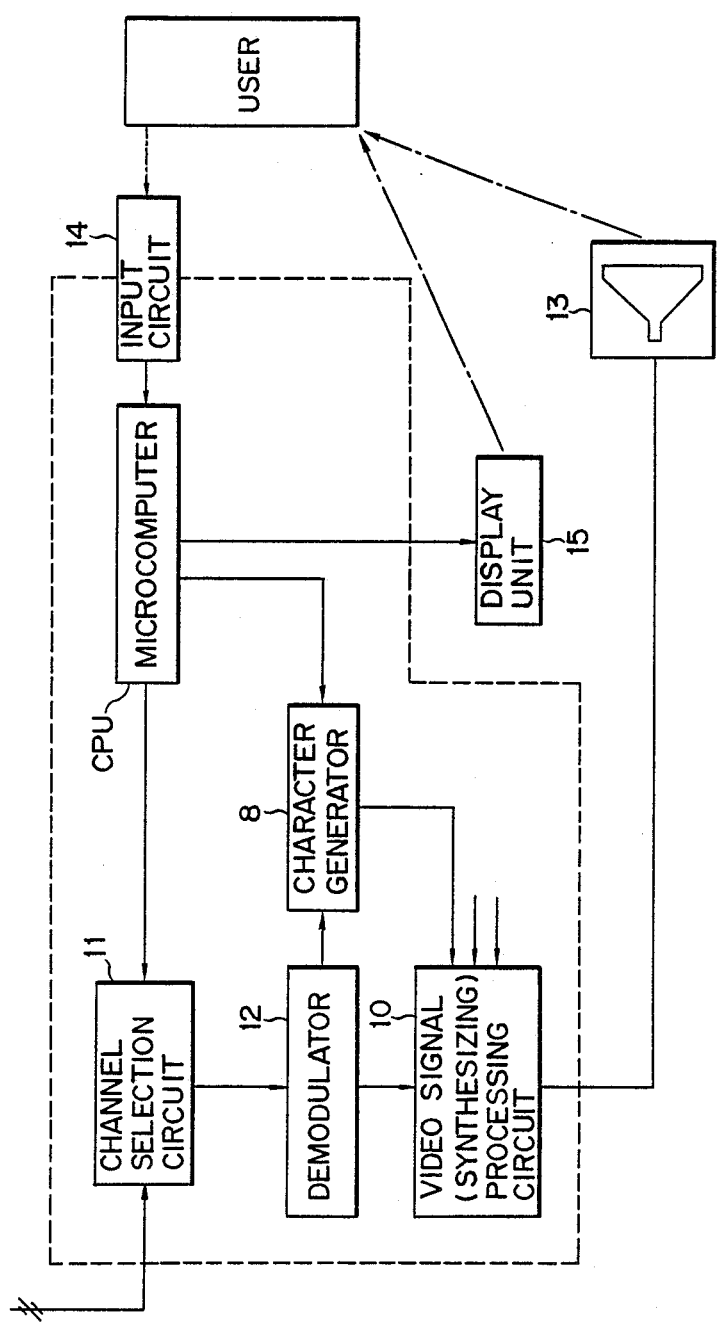
FIG. 8 is a block diagram of a circuit according to a second embodiment of the present invention.

FIG. 8 shows a second embodiment. An RF signal from an antenna is selected by channel selection circuit 11, and converted into an IF signal. The IF signal is demodulated by demodulator 12, clamped by a clamp circuit shown in FIG. 6, and supplied to video signal processing circuit 10. Channel selection data is supplied to channel selection circuit 11 from microcomputer (CPU). An output from video signal processing circuit 10 is supplied to display unit 13. Control data obtained from the user who operates the keyboard or the remote controller is supplied to the CPU through input circuit 14. The CPU controls the functions of video equipment in accordance with the contents of external control data. The CPU can control display contents on display unit 15 which uses light-emitting elements or the like. In addition, the CPU can supply luminance and chrominance control signals to video signal processing circuit 10. Furthermore, as shown in FIG. 1, the CPU can supply a volume control signal to the audio circuit. Note that in the embodiment in FIG. 7, self-diagnose function is effected by the CPU in the same manner as in the embodiment in FIG. 1.

Next, a third embodiment will be described. In a video system according to this embodiment, a video apparatus comprises an information input circuit capable of supplying to an arbitrary holding circuit input control information which corresponds to input information supplied in accordance with an external operation, a determination circuit for storing the input control information while the input information is input to the information input circuit, and performing a determination with respect to the input information to generate output control information for controlling a control circuit in the video apparatus, and a superposing circuit serving as a control result display circuit for superposing a display signal, in which the input control information and arbitrary information of output control information are substantially set in a one-to-one correspondence, on the video signal, when the determination circuit determines that the input information is specific input information used to confirm that an operation in the video apparatus is different from a normal operation.

According to the above arrangement, when a circuit of a control system in the video apparatus is failed, it can be quickly discriminated which control system should be checked by causing the control result display circuit to superpose a display signal on a video signal and display the result.

FIG. 9 shows a video system according to a third embodiment of the present invention, which is applied to a satellite broadcast receiver currently available in the USA. A wave received by antenna including a first converter is converted into a signal having a frequency band of 1 GHz and supplied to second converter 121 in the receiver as input signal 120. Second converter 121 outputs local oscillation output 122 to channel selection PLL 124. Channel selection phase locked loop (PLL) 124 controls the local oscillation signal from second converter 121 in accordance with channel selection (frequency) control data 125 so as to set local oscillation output 122 at a constant frequency. IF input signal 127 frequency-converted by second converter 121 is input to IF circuit 128, and is output as demodulated signal 130. IF circuit 128 outputs automatic frequency tuning (AFT) control signal 129 to microcomputer 126. AFT signal is used to logically determine whether a channel selection frequency is in an ideal state, deviated to a lower frequency side or to a higher frequency side. After the channel selection operation, microcomputer (CPU) performs an AFT operation by correcting channel selection control data 125 so as to keep the data always constant using AFT control signal 129.

Demodulated signal 130 is supplied to low-pass filter 131 and is output as video signal 1 obtained by separating only video signal components. As described above, video signal 1 is supplied to clamp circuit 2, in which a DC component is reproduced. Then, the resultant signal is output to video mute circuit 132 through video signal mixer (changer) 111. Video mute circuit 132 outputs a video signal clamped to video output 134 using video mute control signal 133, or inhibits it. In this case, video mute control signal 133 is output from the microcomputer (CPU) and controls video mute circuit 132 to perform an output inhibition operation when the receiver is in the nonoperative state.

Demodulated signal 130 is input to low-pass filter circuit 131, and also to high-pass filter circuit 135 from which demodulated signal 130 is output as sound carrier signal 136. At least one or a plurality of sound carrier frequencies are superposed on this sound carrier frequency within the range of 5.0 to 8.5 MHz. In stereo broadcasting, two transmission methods are selectively employed, i.e., a method of independently transmitting two waves Lch and Rch, and a method wherein two waves, i.e., the L−R and L+R signals are independently transmitted, and matrixed and demodulated in the receiver side. Therefore, two systems of audio demodulators are used for stereo broadcasting. Sound carrier signal 136 is input to first audio IF circuit 137 and second audio IF circuit 142. First audio IF circuit 137 outputs local oscillation output 138 to first audio PLL circuit 140. First audio PLL circuit 140 outputs first audio local oscillation control signal 139, whose frequency is made identical to a local oscillation frequency determined by first audio channel selection data 141 from the microcomputer (CPU), to first audio IF circuit 137, thereby causing first audio IF circuit 137 to choose a desired sound carrier frequency. Similarly, second audio IF circuit 145 controls the local oscillation frequency using second audio PLL circuit 145. In this case, the microcomputer (CPU) outputs second audio channel selection data 144 to second audio PLL circuit 145 so as to cause second audio IF circuit 145 to choose a desired sound carrier frequency using second audio local oscillation control signal 146 independent from first audio local oscillation control signal 139. First audio signal 147 demodulated by first audio IF circuit 137 and second audio signal 148 demodulated by second audio IF circuit 145 are supplied to matrix circuit 149. When the audio signals are used for monaural sound, matrix circuit 149 outputs demodulated signals 147 as L and R signals 151 and 152 in accordance with matrix control signal 150 from the microcomputer (CPU) When the audio signals are independently received as stereo broadcasting signals, matrix circuit 140 outputs first and second demodulated audio signals 147 and 148 as L and R signals 151 and 152, respectively. When matrix stereo broadcasting signals are received, the L+R and L−R signals are respectively chosen as first and second audio demodulated signals 147 and 148, and then L signal 157 is obtained as (fist demodulated audio signal 147 +second demodulated audio signal 148)/2 while a signal obtained as (first demodulated audio signal 147 - second demodulated audio signal 148)/2 is output as R signal 152.

L and R signals 151 and 152 are supplied to volume controller 153. Subsequently, amplitudes of L and R signals 151 and 152 are increased/decreased in accordance with volume control signal 154 from the microcomputer (CPU), and the resultant signals are supplied to audio mute circuit 155. Audio mute circuit 155 is controlled by audio mute control signal 156 from the microcomputer (CPU) so as to prevent audio noise when selection channels are switched or inhibit audio signals to be output to L and R outputs 157 and 158 serving as external output terminals when the receiver is rendered inoperative.

In addition, the microcomputer (CPU) controls display circuit 159 using display control signal 160. Display circuit 159 utilizes a light-emitting diode (LED) or a fluorescent display tube to inform the user of a selected channel, an audio mode, i.e., either monaural, stereo, or matrix stereo mode, and the state of the receiver such as an audio channel selection frequency.

When the user operates remote control unit 161 to supply an input to the microcomputer (CPU), remote control signal 63 obtained by converting an optical signal into an electrical signal using remote control reception circuit 162 in the receiver is input to the microcomputer (CPU). In addition, the user can supply input information to the microcomputer (CPU) by manually operating key input circuit 164.

In the above arrangement, the key input circuit shown in FIG. 3 can be used as key input circuit 164. In the circuit, a key input determination system, i.e., a so-called key scanning system is employed. When pulses having different timings shown in FIG. 3 are supplied to terminals P5 to P8 as key scanning signals 166 for the microcomputer (CPU), key input circuit 164 supplies logical outputs obtained at terminals P1 to P4 to the microcomputer (CPU) as key input signals 165. Then, the microcomputer (CPU) determines the presence/absence of each operation state of 16 (4×4) switches. For example, when key A in FIG. 3 is depressed, the microcomputer (CPU) sets terminal P5 at high level using key scanning signal 166, thereby obtaining (P1, p2, P3, p4) p5 =(1000) as a logical value indicating that key input signal 165 is obtained. When terminal P5 is set at low level and terminal P6 is set at high level using key scanning signal 66, (P1, P2, P3, P4) P6 =(0000) is obtained as the logical value of key input signal 165. (p1, p2, P3, P4) p7=(0000) and (p1, p2, p3, p4) P8 =(0000) are obtained in the same manner as described above. Then, the four logical value outputs are input to the microcomputer (CPU). The microcomputer (CPU) determines from the above logical values that key A is depressed.

It is desirable that operation mode switching circuit 167 for switching the mode to a test mode which 15 different from a normal operation state is designed so as to not be easily operated by the user. Therefore, operation mode switching signal 168 is input to the microcomputer (CPU) by a selection/switching operation for test switches 167a to 167n of a lock type arranged in the receiver. When operation mode switching signal 168 is set at low level, the normal operation mode is set, whereas when it is at high level, the test mode is set. The microcomputer (CPU) comprises a RAM serving as a holding circuit for temporarily storing operation control data for input and output control signals as the input and output signals and for storing the set control data (e.g., channel selection data 125 corresponding to a selection channel), a ROM for storing each logical determination and a processing sequence of each control data in accordance with an input control signal, an operation circuit for performing the operation conversion, an input circuit for receiving an input signal, and an output circuit for outputting an output signal. The microcomputer (CPU) functions as a determination circuit in this embodiment.

In the normal mode wherein operation mode switching circuit 167 outputs low-level operation mode switching signal 168, remote control signal 163 or key input signal 165 is supplied to the microcomputer (CPU) as an input control signal through remote control reception circuit 162 or key input circuit 164. The microcomputer (CPU) stores each input control signal and at the same time converts the signal into a control code, thereby executing a processing routine in accordance with each control code. In each processing routine, control data corresponding to a control code is set and stored as an output control signal and at the same time output to a control circuit such as channel selection PLL circuit 124. Each control circuit performs processing in accordance with a corresponding output control signal. The above-described processing is the same as that in the conventional receiver.

When it is required to confirm whether the receiver is erroneously operated or not, a specific user who knows the presence of mode switching circuit 167 switches its key input test switch 167a to high level so as to set a key input test mode. For a simple description, assume that key input circuit 164 has 16 keys, as shown in FIG. 2, and the key scanning system is employed. When the specific user depresses desired keys of key input circuit 164 to operate the receiver, output data are obtained at terminals P1 to P4 in response to key scanning signal 166 from microcomputer 126 and key input signal 165. The output data are temporarily stored in the data holding section in the microcomputer (CPU) as an input control signal.

In this case, the storage format corresponds to the key arrangement as in the first embodiment shown in FIG. 5A. If the data in this storage section are extracted in, e.g., the column direction, the data can be represented as binary data, as shown in FIG. 5B. Then, the microcomputer (CPU) generates graphic data shown in FIG. 5C, which shows a one-to-one correspondence with the data of the input control signal and in which high- and low-level portions of the data are discriminated. The microcomputer (CPU) converts the graphic data into control data for character generator 8 and outputs it to character generator 8 as control data 9. With this operation, a block identical with the key arrangement shown in FIG. 5D is displayed on the screen of CRT display unit 113. In the block, portions corresponding to the keys which have been operated are displayed as white ones, whereas portions which have not operated are displayed as black ones.

Thus, the user can confirm whether his operation coincides with a display state or not. Accordingly, when a control function of the receiver or the system is not properly operated, if it is confirmed upon above operation that desired key input is not performed or an unnecessary key is input, a defective portion is present between the keyboard of key input circuit 164 and the I/O port of the microcomputer (CPU) (e.g., a connection defect such as a disconnection or a short circuit). When key input is normally performed but a control function of the system is not properly operated, an output control terminal of the microcomputer (CPU) or a corresponding control circuit in the system is rendered defective.

When it is confirmed upon the above operation that key input circuit 164 is properly operated, key input test switch 167a of mode switching circuit 167 is returned to low level, and PLL test switch 167b is switched to high level, thereby setting a PLL circuit test mode. In this case, for a simple description, assume that channel selection control data 125 to channel selection PLL circuit 124, first audio channel selection data 141 to first audio PLL circuit 140, and second audio channel selection data 146 to second audio IF circuit 145 are operated by serial data shown in FIG. 10A and a clock shown in FIG. 10B. In this case, assume that 16-bit data, before a load pulse shown in FIG. 11C is input, is supplied as effective data for each of PLL circuits 124, 140 and 145. In addition, PLL data in FIG. 11A and data clock signal in FIG. 11B are supplied from the microcomputer (CPU) to each of PLL circuits 124, 140 and 145 through a corresponding common terminal. Furthermore, specific load signals shown in FIGS. 11C, 11D, and 11E are respectively supplied to PLL circuits 124, 140 and 145. When the user enters an input control signal for a channel selection input to the microcomputer (CPU) through key input circuit 164 or remote control unit 161, the microcomputer (CPU) converts the input control signal into a control code, thereby executing a processing routine in accordance with each control code. In this case, a routine for channel selection is executed. The control code is converted into channel selection control data 125 corresponding to a new channel for channel selection PLL circuit 124 and then temporarily stored in the data holding section in the microcomputer (CPU) as an output control signal (i) to be output therefrom, as shown in FIG. 12A. Subsequently, the microcomputer (CPU) reads out control data for first audio PLL circuit 140 and second audio PLL circuit 145, which are stored so as to correspond to the new channel, from a storage section. The microcomputer (CPU) temporarily stores the data in its data holding section as output control signals (ii) and (iii), as shown in FIG. 12A. Then, the microcomputer (CPU) outputs output control signals (ii) and (iii) to first audio PLL circuit 140 and second audio PLL circuit 145 as first and second audio channel selection data 141 and 146, respectively. The microcomputer (CPU) converts each of 16-bit output control signals (i), (ii), and (iii), or example, as shown in FIG. 12A, into graphic data in the same manner as in the processing in the key test mode, converts them into control data for character generator 8, and then outputs the resultant data to character generator 8 as control data 9. With this operation, a block similar to the one in the key test mode is displayed on the screen of display unit 113. As shown in FIG. 12B, in the block, portions corresponding to "1"s in the serial data become white, whereas portions corresponding to "0"s become black.

With this operation, the user can confirm whether an output control signal from the microcomputer (CPU) is normal or not. If the output control signal from the microcomputer (CPU) is not normal, the microcomputer (CPU) itself or an input control signal to the microcomputer (CPU) is defective. If the output control signal is normal, it is found that a defective part is present in the wiring between the microcomputer (CPU) and each control circuit or in each control circuit.

Subsequently, by setting switches 167c, 167d, and 167e of mode switching circuit 167 so as to correspond to the volume control, matrix, and mute circuits, each test mode can be set, and each output control signal is displayed on the screen, thereby obtaining data for determining the state of each circuit.

Figure 13B:
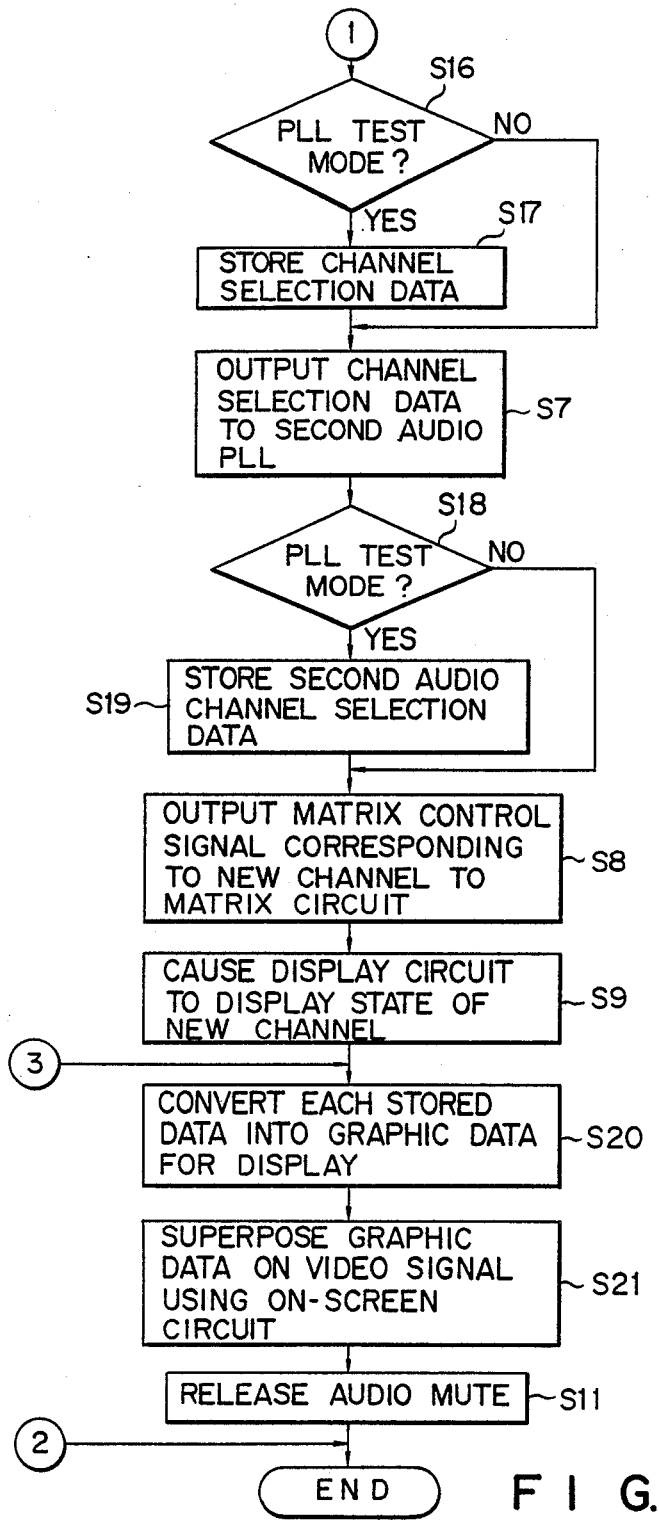

FIGS. 13A and 13B are flow charts for the channel selection processing, and the above-described key input test and PLL test mode. Note that the same reference numerals in FIGS. 13A and 13B denote the same processing as in the normal mode to be described later in FIGS. 14A and 14B. When the key input test mode is determined in step S12, a key input control signal is stored (step S13). When the PLL test mode is determined in step S1, an output control signal for each PLL circuit is stored (steps S14, S15, S16, S17, S18, and S19), and each stored data is converted into graphic data, which is then superposed on a video signal to be displayed (steps S20 and S21). Other processing steps are performed in the same manner as in the conventional technique. If they are normally operated, video and audio signal outputs are displayed in the same manner as in general use (normal operation mode), except for an on-screen display.

As shown in FIGS. 14A and 14B, in the normal operation mode, the microcomputer (CPU) determines from remote control signal 163 whether the user inputs data through remote control reception circuit 162 using remote control unit 161 (step S1). If YES in step S1, the flow advances to determination processing for the input control signal (step S3). If NO in step S1, the presence/absence of an key input to key input circuit 164 is determined by the key scanning system (step S2). If NO, the processing is finished. Otherwise, code determination for an input control signal is performed (step S3). If it is information for requesting channel switching, e.g., requesting a channel number to be increased, the following processing is performed. If it is related to other information, the processing is finished. When the information is related to channel switching, audio mute control signal 156 is output to mute an audio output (step S4), and channel selection control data 125 corresponding to a new channel to be selected is output (step S5), thereby receiving a new broadcasting program. Then, two sound carrier frequencies corresponding to the new channel are set at the frequencies prestored by the user by using first and second audio channel selection data 141 and 146 (steps S6 and S7) and y matrix control signal 150 in accordance with an audio matrix operation (step S8). Subsequently, the new channel and the audio mode are displayed on display circuit 159 serving as a display section of the receiver in accordance with display control signal 160 (step S9). The new channel number is superposed on the video signal in accordance with control data 9 using the on-screen circuit (step S10) and the resultant data is displayed on an external display unit. Then, the mute state of the audio output is released by audio mute control signal 156 and the channel selection operation is finished (step S11).

A case will be exemplified as a conventional technique for determining whether the circuit operation of the matrix keyboard in FIG. 3 is normal or not when a defective part is detected. For observation of signals, an oscilloscope is generally used for measuring waveforms of AC signals. When a pulse of key scanning signal 166 supplied to terminal P5 rises to high level, a trigger pulse is supplied to the oscilloscope to observe a pulse of key input signal 165 supplied to terminal 165. A waveform identical with that of the signal appearing at terminal P5 upon depression of key A is observed and confirmed by depressing a key excluding key A in FIG. 3. When the key on the right side of key A in FIG. 3 is to be tested, a trigger pulse is supplied to the oscilloscope using a pulse appearing at terminal P5 in the same manner as described above. Similarly, it is confirmed that when other keys are depressed, a signal identical with the signal appearing at terminal P5 is not output at terminal P2. According to such a conventional technique, the above observation is performed for 16 keys, and it must be confirmed that one of key scanning signals 166 is input to microcomputer 26 as key input signal 165. Changes in state of key input signal 165 and key scanning signal 166 must be accurately observed for each key in this manner. Therefore, the number of tests is increased with an increase in number of keys. When a circuit board in the receiver cannot be directly connected to a measurement point is observation, a necessary circuit board must be taken out from the receiver to be measured. In addition, according to the conventional technique, when the key matrix circuit section is normally operated, other circuit sections must be tested after the receiver, which has been disassembled for measurement, is assembled. Since disassembly and assembly operations are required for a test, operation time is greatly increased.

Figure 10:
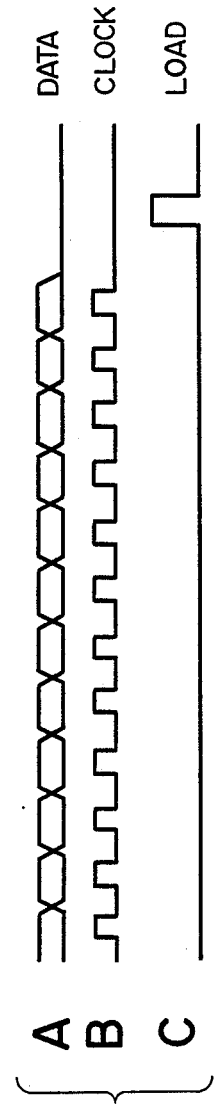
Figure 11:
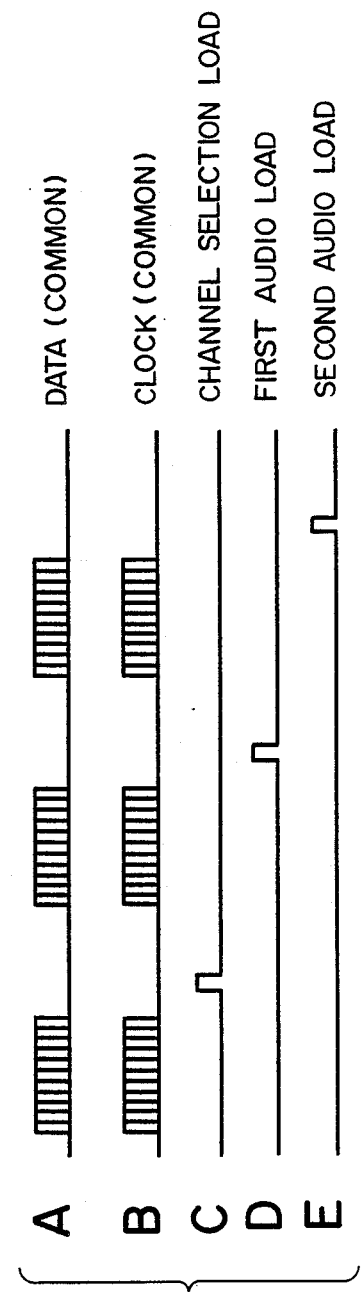

In addition, assume that channel selection data 125, which is an output control signal from the microcomputer (CPU) to channel selection PLL circuit, is 16-bit serial data shown in FIG. 10, 16-bit data before the load signal (FIG. 10C) goes to high level is input into channel selection PLL circuit 124, and the data signal (FIG. 10A) and the clock signal (FIG. 10B) are commonly used with other control signals. When channel selection data 125 is tested by the conventional technique, channel selection control data 125 cannot be determined by simply observing the data signal (FIG. 10A) and the clock signal (FIG. 10B) using the oscilloscope because they are commonly used with other control signals. Furthermore, if a trigger signal is applied to the oscilloscope during the ON period of the load signal (FIG. 10C) for observation, synchronization can be established within the ON period of the load signal. However, since the control data appears before the load signal as a function of time, the control data cannot observed by a general-purpose oscilloscope. In addition, since it does not have such synchronous characteristics as the operation of the matrix keyboard which is repeated every predetermined time interval, the data cannot be observed at a specific timing such as the channel switching timing by using the general-purpose oscilloscope Therefore, it is difficult to determine whether the microcomputer (CPU) or channel selection PLL circuit 124 is failed, or other circuits are failed.

It can be more clearly understood from this viewpoint that the video system with the self-diagnose function according to the present invention is very effective.

According to another embodiment of the present invention, instead of using a method of displaying input and output control signals as graphic data, a method of displaying them in binary, decimal, or hexadecimal notation can be used and the same function as in the previous embodiment can be obtained.

In addition, according to still another embodiment of the present invention, instead of using a lock switch as mode switching circuit 167, for example, a specific password of about 4 digits, which is unlikely to be misused by a general user, in input to the receiver to constitute the test mode.

Furthermore, video signal mixer 111 and video signal processing (synthesizing) circuit may include a video signal changer circuit or video signal superposing circuit.

As has been described above, according to the present invention, the difference between control information that the user inputs and control information actually obtained in the system, and the control information itself can be confirmed on the screen for imaging a video signal by utilizing the control system itself in the video apparatus and its display means. Thus, a defective part in an operation can be estimated through the screen, thereby facilitating repair, inspection, and maintenance. In addition, even if an input/output port is employed wherein each control data is time-divisionally input/output, there is provided a test instrument in the video apparatus, wherein a defective part can be found for a short period of time.

What is claimed is:

1. A video system with a self-diagnose function, comprising:
   video signal processing means for receiving a video signal and performing predetermined processing for the video signal;
   control information supplying means, coupled to said video signal processing means, for supplying output control information for the predetermined processing;
   information input means, coupled to said control information supplying means, for receiving input control information for changing the output control information;
   determination means, coupled to said information input means and said control information supplying means, for determining a relationship between the output control information and the input control information;
   display signal generating means, coupled to said determination means, for generating a predetermined display signal corresponding to a determination result from said determination means;
   synthesizing means, coupled to said video signal processing means and said display signal generating means, for synthesizing the predetermined display signal on the video signal processed by said video signal processing means; and
   display means for receiving and displaying an output signal from said synthesizing means.

2. A system according to claim 1, wherein said video signal processing means includes at least one of a channel selection circuit, a demodulator, and an audio circuit, and said control information supplying means supplies output control information for the predetermined processing corresponding to at least one of said circuits included in said video signal processing circuit.

3. A system according to claim 1, wherein said information input means includes at least one of a key input circuit and a remote control input circuit.

4. A system according to claim 1, wherein said information supplying means is a holding circuit a microcomputer and said determination means is a determination circuit in said microcomputer.

5. A system according to claim 4, wherein said display signal generating means is a character generator controlled by said microcomputer.

6. A system according to claim 1, wherein said determination means determines whether the input control information is larger or smaller than or equal to the output control information.

7. A system according to claim 1, wherein said synthesizing means includes at least one of a video signal changer circuit and video signal superposing circuit.

8. A video system with a self-diagnose function, comprising:
   video signal processing means for receiving a video signal and performing predetermined processing for the video signal;
   control information supplying means, selectively coupled to said video signal processing means, for supplying output control information for the predetermined processing;
   information input means, coupled to said control information supplying means, for receiving input control information for changing the output control information;
   mode switching means for selectively providing a normal mode signal for designating a normal operation of said video system and a test mode signal for designating a test operation of said video system;
   converting means, selectively coupled to said control information supplying means, for converting the output control information changed in accordance with the input control information into a predetermined display signal;
   determination means, coupled to said mode switching means, said control information supplying means, and said converting means, for coupling said control information supplying means to said video signal processing means in accordance with the normal mode signal, and for coupling said control information supplying means to said converting means in accordance with the test mode signal;
   synthesizing means, coupled to said converting means and said video signal processing means, for synthesizing the predetermined display signal on the video signal processed by said video signal processing means; and
   display means for receiving and outputting an output signal from said synthesizing means.

9. A system according to claim 8, wherein said video signal processing means includes at least one of a channel selection circuit, a demodulator, and a audio circuit, and said control information supplying means supplies the output control information for the predetermined processing corresponding to at least one of said circuits included in said video signal processing circuit.

10. A system according to claim 8, wherein said information input means includes at least one of a key input circuit and a remote control input circuit.

11. A system according to claim 8, wherein said information supplying means is a holding circuit in a microcomputer and said determination means is a determination circuit in said microcomputer.

12. A system according to claim 11, wherein said converting means is a character generator controlled by said microcomputer.

13. A system according to claim 8, wherein said determination means outputs a determination result representing whether a one-to-one correspondence is substantially established between the input control information and the output control information.

14. A system according to claim 13, wherein said display signal generating means generates a display signal representing a determination result output from said determining means and determining whether the one-to-one correspondence is established.

15. A system according to claim 9, wherein said mode switching means provides signals corresponding to a plurality of test items as the test mode signals.

16. A system according to claim 15, wherein said mode switching means provides a key input test mode signal for said information input means as a first test mode signal, and provides a test mode signal for said video signal processing means as a second test mode signal.

17. A system according to claim 16, wherein the second test mode signal includes a PLL test mode signal for testing a PLL circuit for a frequency converting section included in sad channel selection circuit section and a PLL circuit included in said audio circuit.

18. A system according to claim 16, wherein the second test mode signal includes at least one of test mode signals used for independently testing a video mute circuit included in said channel selection circuit section as well as a matrix circuit, a volume controller, and an audio mute circuit included in said audio circuit.

19. A system according to claim 8, wherein said mode converting means includes a lock type switch.

20. A reception system with a self-diagnose function comprising:

means for receiving a video signal from a satellite broadcast;

processing means for performing predetermined processing of said video signal;

control information supplying means, selectively coupled to said processing means, for supplying output control information for the predetermined processing;

information input means, coupled to said control information supplying means, for receiving input control information for changing the output control information;

mode switching means for selectively providing a normal mode signal for designating a normal operation of said reception system and a test mode signal for designating a test operation of said reception system;

converting means, selectively coupled to said control information supplying means, for converting the output control information changed in accordance with the input control information into a predetermined display signal;

determination means, coupled to said mode switching means, said control information supplying means, and said converting means for coupling said control information supplying means to said processing means in accordance with the normal mode signal, and for coupling said control information supplying means in accordance with the test mode signal;

synthesizing means, coupled to said converting means and said processing means, for synthesizing the predetermined display signal on the video signal processed by said processing means; and display means for receiving and outputting an output signal from said synthesizing means.

* * * * *